United States Patent
Otwani et al.

(10) Patent No.: US 10,757,667 B2
(45) Date of Patent: Aug. 25, 2020

(54) METHOD AND USER EQUIPMENT FOR MANAGING SYNCHRONIZATION WITH NETWORK

(71) Applicant: SAMSUNG ELECTRONICS CO., LTD., Suwon-si (KR)

(72) Inventors: Jitendra Otwani, Indore (IN); Varun Vanama, Kakinada (IN); Anies Shaik Sulaiman, Kochi (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 15/961,233

(22) Filed: Apr. 24, 2018

(65) Prior Publication Data

US 2019/0028987 A1 Jan. 24, 2019

(30) Foreign Application Priority Data

Jul. 21, 2017 (IN) .............................. 201741025972

(51) Int. Cl.
*H04W 56/00* (2009.01)
*H04W 76/25* (2018.01)
*H04W 88/06* (2009.01)
*H04W 72/04* (2009.01)

(52) U.S. Cl.
CPC ......... *H04W 56/003* (2013.01); *H04W 76/25* (2018.02); *H04W 72/0413* (2013.01); *H04W 88/06* (2013.01)

(58) Field of Classification Search
CPC .... H04W 56/003; H04W 76/25; H04W 88/06
See application file for complete search history.

(56) References Cited

U.S. PATENT DOCUMENTS

| | | | |
|---|---|---|---|
| 7,684,407 B2 | 3/2010 | Kuchibhotla et al. | |
| 9,049,016 B2 | 6/2015 | Cave et al. | |
| 9,210,688 B2 | 12/2015 | Kanamarlapudi et al. | |
| 2013/0215869 A1* | 8/2013 | Srinivasan | H04W 36/14 370/331 |
| 2013/0295920 A1* | 11/2013 | Viswanadham | H04W 36/14 455/426.1 |
| 2013/0337861 A1* | 12/2013 | Bhogaraju | H04W 52/10 455/522 |
| 2015/0009965 A1* | 1/2015 | Maiya | H04W 72/0446 370/336 |

(Continued)

FOREIGN PATENT DOCUMENTS

| | | |
|---|---|---|
| CN | 1889414 B | 5/2010 |
| WO | 2015/126842 A1 | 8/2015 |

*Primary Examiner* — Curtis A Alia
(74) *Attorney, Agent, or Firm* — Sughrue Mion, PLLC (57) ABSTRACT

Provided is a method for managing synchronization with a network. The method includes detecting, by a dual SIM dual standby user equipment (a DSDS UE), a radio frequency resume event (an RF resume event); transmitting, by the DSDS UE, at least one uplink dedicated physical control channel (at least one UL-DPCCH) to the network in response to the RF resume event being detected, wherein the at least one UL-DPCCH is transmitted irrespective of a signal to interference ratio quality (an SIR quality) on a downlink dedicated physical control channel (a DL-DPCCH) of the network being below a first quality threshold; and managing, by the DSDS UE, a downlink (a DL) synchronization with the network.

18 Claims, 10 Drawing Sheets

(56) References Cited

U.S. PATENT DOCUMENTS

| | | | |
|---|---|---|---|
| 2015/0098445 A1* | 4/2015 | Chakravarthy | H04W 36/14 370/331 |
| 2015/0133130 A1* | 5/2015 | Gupta | H04W 76/15 455/450 |
| 2016/0191375 A1* | 6/2016 | Gopala Krishnan | H04L 45/22 370/217 |
| 2016/0315736 A1* | 10/2016 | Dwarakanath | H04W 24/02 |

\* cited by examiner

METHOD AND USER EQUIPMENT FOR MANAGING SYNCHRONIZATION WITH NETWORK

CROSS-REFERENCE TO RELATED APPLICATION

This application claims priority from Indian Patent Application No. 201741025972, filed on Jul. 21, 2017 in the Indian Patent Office, the disclosure of which is incorporated herein by reference in its entirety.

FIELD

Methods and apparatuses consistent with example embodiments generally relate to wireless communication network. More particularly, to a method and User Equipment (UE) for managing synchronization with the wireless communication network.

BACKGROUND

Dual SIM Dual Standby (DSDS) phones (i.e., DSDS User Equipments (UEs)) are designed to share a single radio frequency (RF) between two stacks (i.e., stack-1 and stack-2). A DSDS UE may communicate using radio link control (RLC) during an uplink (UL) and downlink (DL). When the stack-1 of the DSDS UE is performing a high-speed downlink packet access (HSDPA) or Long Term Evolution (LTE) data transfer, the RF is continuously required by the stack-1. However to maintain paging reception, measurements and signalling on the stack-2 of the DSDS UE, RF usage gaps (i.e., DSDS gaps) are temporarily created for the stack-1 (as shown in FIG. 1, block (b)) in either a scheduled or unscheduled fashion.

Figure 1:
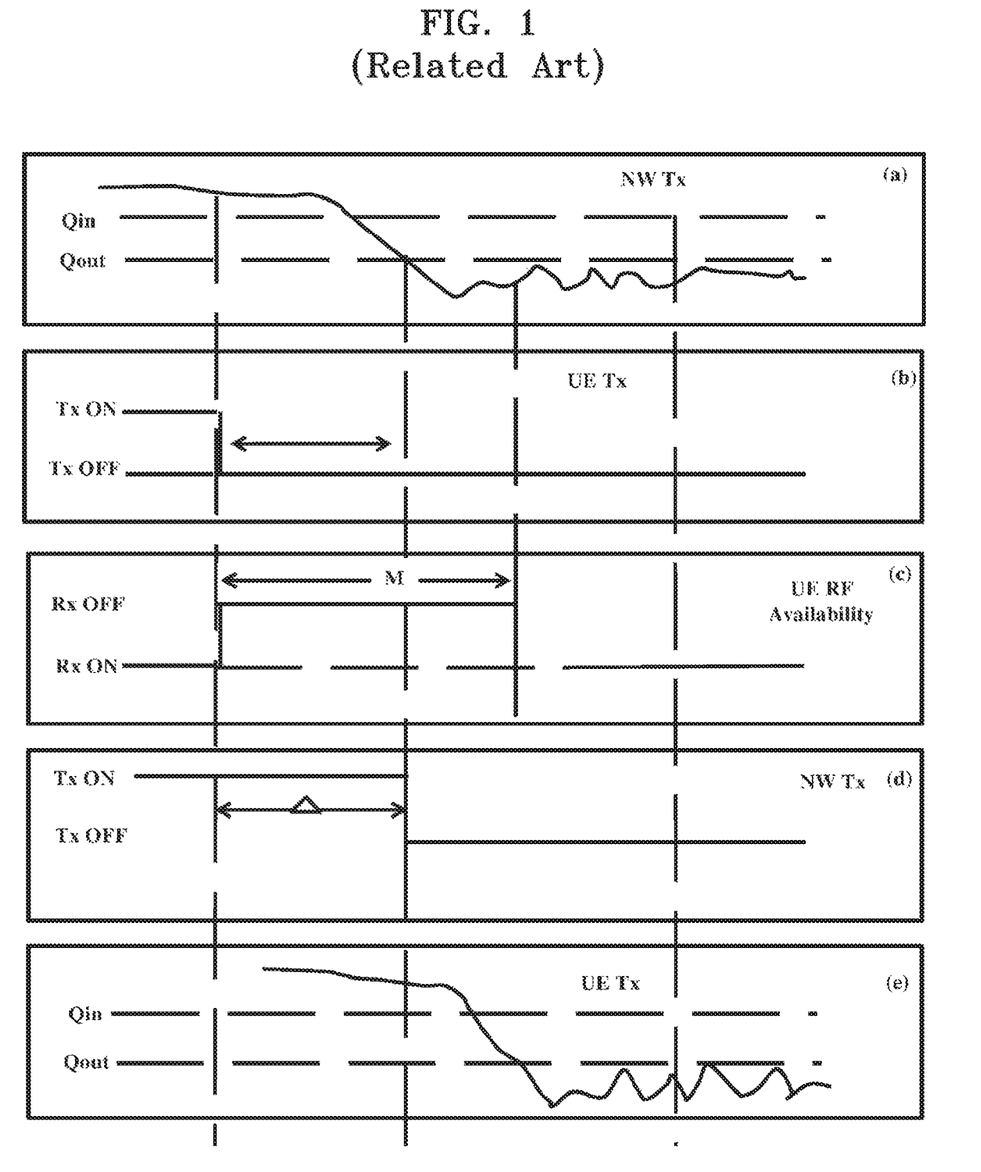
FIG. 1 illustrates channel characteristics between a DSDS UE and a network.

Physical Layer Synchronization:

In a connected mode, the DSDS UE continuously decodes a dedicated physical control channel (DPCCH) to maintain synchronization with the network, and vice versa, If the DPCCH signal to interference ratio (SIR) drops below a set threshold (Qout) (as shown in FIG. 1, block (a)) the stack-1 physical layer starts reporting Out of Sync (OOS) to a resource controller and ceases the transmission path i.e., no uplink dedicated physical control channel UL-DPCCH transmission. If consecutive OOS indications are received N313+T313 times, the resource controller releases the resource and starts a recovery mechanism. In case of DSDS due to non-contiguous RF availability, the DPCCH decoding, at the DSDS UE, for all Radio frames is not possible and the network will receive noise in the UL-DPPCH for RF void intervals.

Because the network is unaware of the DSDS RF gaps, the network considers the noise as the actual information and therefore attempts to decode the noise as a UL-DPCCH. This results in a drop in UL-DPCCH average and a SIR drop. If RF gaps are of considerable duration, this may result in switching off network transmission falsely (as shown in FIG. 1, block (d)). In such cases, stack-1, after an RF resumption (as shown in FIG. 1, block (c)), observes noise in the DL-DPCCH and in turn ceases its transmission after a few frames (as shown in FIG. 1, block (e)). Therefore, it can be easily observed that RF communication between the DSDS UE and the network is halted. In such cases DSDS UE can recover only after expiration of a timer such as an N313+T313 timer.

Figure 2:
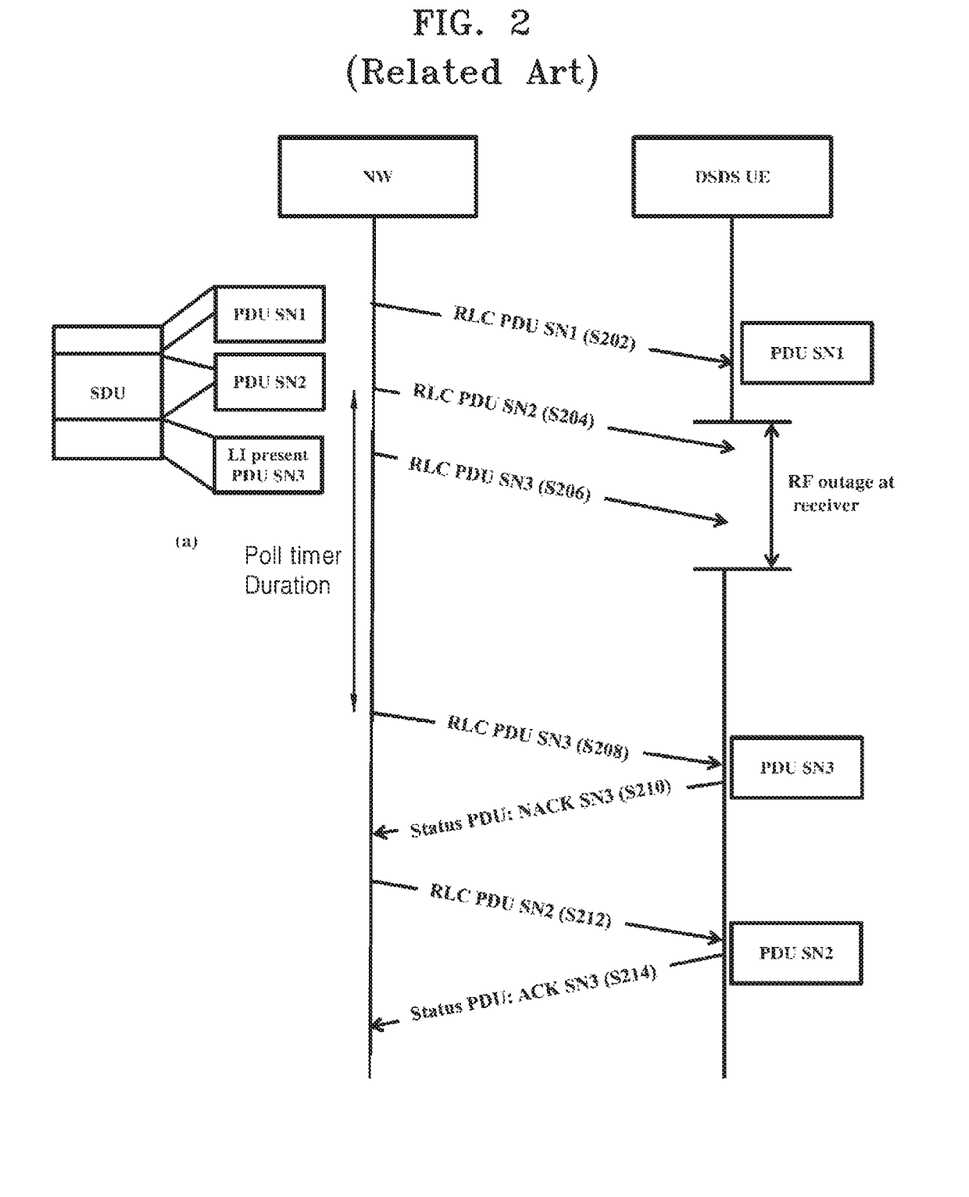
FIG. 2 is a sequence diagram illustrating a step by step procedure for receiving link layer downlink PDU missed data packets by the DSDS UE.

Link Layer Downlink Protocol Data Unit (PDU) Miss:

Consider a scenario in which the network is trying to send the data packet i.e., one service data unit (SDU), to the DSDS UE. The SDU is segmented into multiple Protocol Data Units (PDUs) (e.g., three PDUs as shown in FIG. 2(*a*)). The essential parameter length indicator (LI) is added to the last PDU, as the LI indicates the length of the PDUs (LI=3) which in turn indicates completion of the SDU transmission from the network.

As discussed above, in order to maintain paging reception, measurements and signalling on the stack-2 of the DSDS UE, RF usage gaps (i.e., DSDS gaps) are created temporarily for the stack-1.

Referring to the FIG. 2, consider if the network has transmitted (S202, S204 and S206) RLC PDU SN1, RLC PDU SN2 and the RLC PDU SN3 to the DSDS UE. As seen in the FIG. 2, the DSDS UE has only received the RLC PDU SN1, and fails to receive the RLC PDU SN2 and the RLC PDU SN3 due to the RF gap.

In such a case, detection of missed PDUs (i.e., the RLC PDU SN2 and the RLC PDU SN3) will happen when poll timer at the network expires, in which case the network retransmits the missed PDUs through an acknowledgement (ACK)/negative acknowledgement (NACK) procedure, described below:

Once the poll timer expires, the last PDU i.e., RLC PDU SN3 is retransmitted (S208) to the DSDS UE.

Further, the DSDS UE transmits (S210) the NACK for RLC PDU SN2 and ACK for RLC PDU SN3, based on the ACK/NACK status received the network can retransmit (S212) the RLC PDU SN2 to the DSDS UE. Further, the DSDS UE transmits (S214) the ACK for the RLC PDU SN2 to the network.

As seen above, the retransmission of the missed PDUs is entirely dependent on the poll timer at the network side. However, the DSDS UE can possibly move into next RF pause by the time the poll timer expires at network side, also the poll timer value can be as high as 2000 ms.

Figure 3:
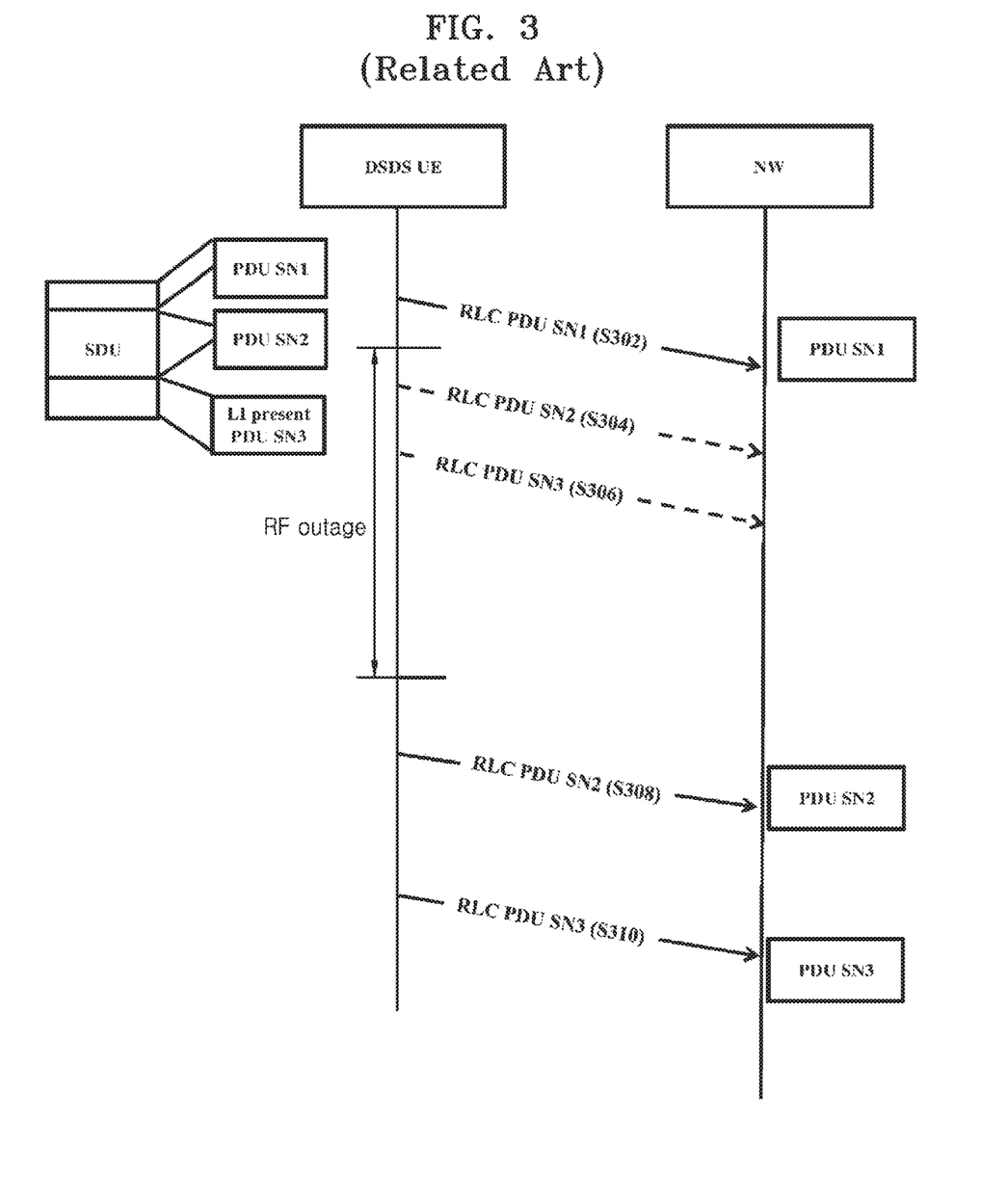
FIG. 3 illustrates is a sequence diagram illustrating a step by step procedure for managing signalling response round trip time delay during transmission of missed data packets to the network.

Signalling Response Round Trip Time Delay:

Consider a scenario in which the DSDS UE trying to transmit the data packet i.e., one service data unit (SDU), which is segmented into multiple PDUs (e.g., three PDUs as shown in FIG. 3), to the network. Because the signalling SDU is segmented into multiple PDUs, the DSDS UE can take multiple transmission time intervals (TTIs) to complete transmission of the SDU. The essential parameter length indicator (LI) is added to the last PDU, as the LI indicates the length of the PDUs (for example LI=3) which in turn indicates completion of the SDU transmission.

If the RF pause happens during the transmission of the SDU and the SDU transmission is not yet completed, pending segments of the SDU will be transmitted after the RF resumes. For example, referring to the FIG. 3, the DSDS UE transmits (S302) the RLC PDU SN1 and incurs the RF pause (RF outage) thereby the transmission (S304 and S306) of the RLC PDU SN2 and the RLC PDU SN3 are interrupted. The DSDS UE then retransmits (S308 and S310) the RLC PDU SN2 and the RLC PDU SN3 when the RF resumes. This will increase the signalling response round trip time.

In another example, if the RF pause happens after transmission of initial segments of a Measurement Report with Event 1A/1B, then until RF resumes, the measurement report will not reach the network. This will delay the start of event 1A/1B related handling procedure at the network side. As a result, addition/deletion of the reported cell to active set will be delayed.

SUMMARY

Example embodiments provide a method and a DSDS User Equipment (UE) for managing a synchronization with a network (NW).

One or more example embodiments may provide a method and UE for independently maintaining transmission for "At" time irrespective of poor quality of reception, downlink dedicated physical control channel signal-to-noise rations (DL DPCCH SIR), after an RF resumption.

One or more example embodiments may provide a method and User Equipment (UE) for initiating recovery of a data link layer for faster bursty data receptions without waiting for expiration of the poll timer. The data link layer can be initiated as soon as the DSDS UE detects the RF resume event.

One or more example embodiments may provide a method and User Equipment (UE) for reducing signalling response round trip time delay.

One or more example embodiments may provide a method and User Equipment (UE) for granting one of the completion of SDU transmission and the RF pause request based on the request type. The request type includes a time critical activity and type of SDU transmission.

According to an aspect of an example embodiment, there is provided a method for managing synchronization with a network, the method including: receiving, by a dual SIM dual standby user equipment (a DSDS UE), a request to transmit a service data unit (an SDU) to cause the network to trigger a signaling response from a first stack associated with a first network; receiving, by the DSDS UE, a pause request from a second stack associated with a second network; determining, by the DSDS UE, whether the pause request is for a time critical activity; and delaying, by the DSDS UE, a pause procedure corresponding to the pause request in response to determining that the pause request is not for the time critical activity until transmission of the SDU is complete by the DSDS UE.

According to an aspect of another example embodiment, there is provided a method for managing synchronization with a network, the method including: receiving, by a dual SIM dual standby user equipment (a DSDS UE), a request to transmit a service data unit (an SDU) from a first stack associated with a first network; receiving, by the DSDS UE, a pause request from a second stack associated with a second network; determining, by the DSDS UE, whether the pause request is for a time critical activity; delaying, by the DSDS UE, the pause request in response to determining that the pause request is not for the time critical activity; and transmitting, by the DSDS UE, the SDU from the first stack associated with the first network in response to determining that the pause request is for the time critical activity.

According to yet another example embodiment, there is provided a dual SIM dual standby user equipment (a DSDS UE) for managing synchronization with a network, the DSDS UE including: a transceiver; a processor; a memory coupled to the processor; and a synchronization manager coupled to the processor and configured to: detect a radio frequency resume event (an RF resume event); control the transceiver to transmit at least one uplink dedicated physical control channel (at least one UL-DPCCH) to the network in response to the RF resume event, wherein the at least one UL-DPCCH is transmitted irrespective of a signal to interference ratio quality (an SIR quality) on a downlink dedicated physical control channel (a DL-DPCCH) of the network being below a first quality threshold; and manage a downlink (a DL) synchronization with the network.

According to an aspect of still another example embodiment, there is provided a dual SIM dual standby user equipment (a DSDS UE) for managing synchronization with a network, the DSDS UE including: a transceiver configured to communicate with a first network using a first stack and a second network using a second stack; a processor; a memory coupled with the processor; and a synchronization manager coupled with the processor and configured to: receive a request to control the transceiver to transmit a service data unit (an SDU) from the first stack; receive a pause request from the second stack; determine whether the pause request is for a time critical activity; delay the pause request in response to determining that the pause request is not for the time critical activity; and control the transceiver to transmit the SDU from the first stack associated with the first network in response to determining that the pause request is for the time critical activity.

BRIEF DESCRIPTION OF THE FIGURES

Aspects of example embodiments are illustrated in the accompanying drawings, throughout which like reference letters indicate corresponding parts in the various figures. The example embodiments herein will be better understood from the following description with reference to the drawings, in which.

DETAILED DESCRIPTION

Example embodiments will now be described in detail with reference to the accompanying drawings. In the following description, specific details such as detailed configuration and components are provided to assist the overall understanding. Therefore, it should be appreciated by those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, and some example embodiments can be combined with one or more other example embodiments. Herein, the term "or" as used herein, refers to a non-exclusive or, unless otherwise indicated. Also, expressions such as "at least one of" when preceding a list of elements, modify the entire list of elements and do not modify the individual elements of the list. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

As traditional in the field, example embodiments may be described and illustrated in terms of blocks which carry out a described function or functions. These blocks, which may be referred to herein as units, manager, detector, engine, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure Likewise, the blocks of the example embodiments may be physically combined into more complex blocks without departing from the scope of the disclosure.

Further, example embodiments can be applicable for various communication methods, including HSDPA and LTE PDSCH.

Accordingly, the example embodiments herein provide a method for managing synchronization with the network. The method includes detecting a RF resume event. Further, the method includes transmitting at least one uplink dedicated physical control channel (UL-DPCCH) to the network, where the at least one UL-DPCCH is transmitted irrespective of a signal to interference ratio (SIR) quality on a downlink dedicated physical control channel (DL-DPCCH) of the network. Furthermore, the method includes managing the DL synchronization with the network.

In related methods and systems, during an RF pause event at the DSDS UE, the network will try to decode the noise as actual information. This may result in ceasing network transmission falsely if the RF pause is of considerable duration. Consequently, the DSDS UE will lose synchronization with the network after an RF resumption. Example embodiments can be used to mitigate the aforesaid OOS issue between the DSDS UE and the network by independently maintaining transmission of the DSDS UE irrespective of poor DL-DPCCH quality post RF resumption of the DSDS UE, thus achieving faster gain back synchronization with the network.

Example embodiments herein provide a method for managing synchronization with the network. The method includes receiving a request to transmit a service data unit (SDU) from a first stack associated with a first network, receiving a RF pause request from a second stack associated with a second network, determining that the RF pause request is not for time critical activity, delaying the RF pause request in response to determining that the RF pause request is not for time critical activity, and transmitting the SDU from the first stack associated with the first network.

Unlike related methods and systems, where during RF pause the DSDS UE can miss RLC PDUs and the missed PDUs can be detected when RLC detects an out of sequence PDU. This can lead to delay in reception of radio resource control (RRC) control messages. Thus, the proposed method can be used to reduce (and/or eradicate) the delay in the reception of the RRC control messages by performing a faster detection of the missed RLC PDUs.

A DSDS UE may include more than one subscriber identity module (SIM) or universal subscriber identity module (USIM). The DSDS UE with more than one SIM may be referred to as a multi-SIM device. In the present disclosure, the SIM may refer to a SIM or a USIM. Each SIM may also include a unique International Mobile Subscriber Identity (IMSI) and service subscription information. Each SIM may be configured to operate in a particular radio access technology (RAT).

The DSDS UE supports dual-SIM dual-standby operation using a single RF chain to transmit and receive communications. In one example, a multi-SIM device includes a first SIM dedicated to operating in a first RAT and a second SIM dedicated to operating in a second RAT. When a stack-1 (of the first SIM) of the DSDS UE is performing a high-speed downlink packet access/Long Term Evolution (HSDPA/LTE) data transfer, it requires the RF continuously. However, to maintain paging reception, measurements and signalling on the stack-2 (of the second SIM) of the DSDS UE, RF usage gaps (i.e., DSDS RF gaps) are created temporarily for the stack-1 either in scheduled or unscheduled fashion.

Figure 4:
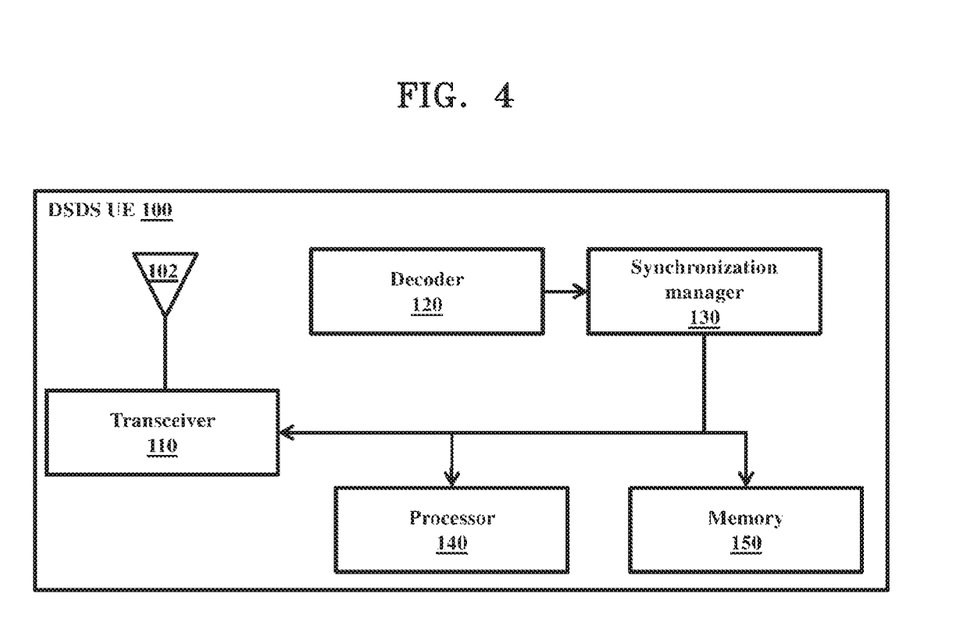
FIG. 4 is a block diagram illustrating various hardware elements of a DSDS UE, according to an example embodiment.

FIG. 4 is a block diagram illustrating various hardware elements of a DSDS UE 100, according to an example embodiment.

In an example embodiment, the DSDS UE 100 may be, for example, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The DSDS UE 100 can also be, for example, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The DSDS UE 100 includes a transceiver 110 (transmitter and receiver), an antenna 102, a decoder 120, a synchronization manager 130, a processor 140, and a memory 150.

The transceiver 110, coupled with antenna 102, can be configured communicate with various other apparatus over a transmission medium. The various other apparatus includes, for example, a network, and any other UE. The network can include, e.g., at least one evolved node B (eNB), a base station (BS), a base transceiver station (BTS), a radio base station, a radio transceiver, a transceiver function, a basic service set (BSS), an extended service set (ESS), an access point (AP), or the like.

The decoder 120 can be configured to decode data (i.e., packet data) available at one or more resource channels. The one or more resource channels include, for example, HS-SCCH, HS-PDSCH, HS-DPCCH, PDCCH, and the like.

Figure 5:
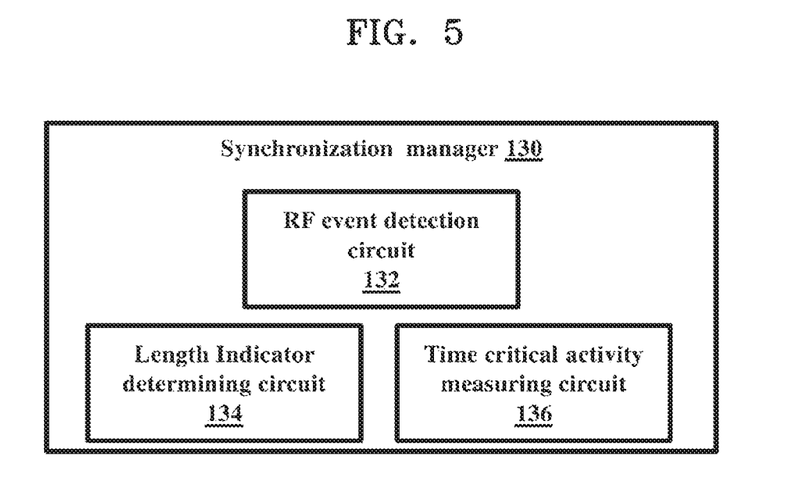
FIG. 5 is a block diagram illustrating various hardware elements of a synchronization manager of the DSDS UE, according to an example embodiment.

The synchronization manager 130 can be configured to manage synchronization with the network. FIG. 5 illustrates additional details of the synchronization manager 130, as discussed below.

The memory 150 can be, for example, a computer-readable medium such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

FIG. 5 is a block diagram illustrating various hardware elements of the synchronization manager 130 of the DSDS UE 100, according to an example embodiment.

The synchronization manager 130 can include, for example, an RF event detection circuit 132, a Length Indicator (LI) determining circuit 134, and a time critical activity measuring circuit 136.

The RF event detection circuit 132 can be configured to detect an RF resume event and an RF pause event.

Further, the transceiver 110 coupled to the RF event detection circuit 132 can be configured to transmit the at least one UL-DPCCH to the network. The at least one UL-DPCCH is transmitted irrespective of low SIR quality on the DL-DPCCH of the network. The SIR quality can be determined using a SIR quality determination circuit.

Therefore, the DSDS UE 100 independently maintains the transmission irrespective of the quality of the DL-DPCCH.

Thus, by virtue of the UL-DPCCH, the synchronization manager 130 can manage the DL synchronization with the network.

In an example embodiment, if the SIR quality determination circuit determines that the SIR quality on the DL-DPCCH (i.e., network) exceeds the pre-defined SIR quality (Qin) on the DL-DPCCH for example, SIR average >SIR target, then the transceiver 110 can receive the instructions from the SIR quality determination circuit, the instructions to abort the transmission of the UL-DPCCH.

In another example embodiment, if the synchronization manager 130 determines that the DL synchronization is not achieved until expiration of a timer (i.e., T313 timer), then the transceiver 110 can receive the instructions from the synchronization manager 130, the instructions to abort the transmission of the UL-DPCCH.

Once the transceiver 110 aborts the transmission of the UL-DPCCH, the DSDS UE 100 can be configured to perform a different Cell Update recovery procedure to re-establish connection with the network.

As stated above, the network transmits the data packet i.e., one service data unit (SDU) to the DSDS UE 100. The SDU is segmented into multiple PDUs. The essential parameter length indicator (LI) is added to the last PDU, as the LI indicates the length of the PDUs, which in turn indicates completion of the SDU transmission from the network.

The LI determining circuit 134 can be configured to determine that the LI is not associated with at least one buffered DL PDU in RLC. The LI indicates successful reception of at least one PDU to form the SDU. In an example embodiment, the absence of LI parameter is indicated by detecting that a duration of the RF gap exceeds one of a dedicated channel (DCH) transmission time interval (TTI) duration and shared channels based on previous reception statistics. In an example embodiment, the previous reception statistics includes an average duration for reception of high priority signalling messages on the shared channels. In another example embodiment, the absence of LI parameter is indicated by detecting that DL PDUs are buffered and last PDU received is not associated with LI.

In response to determining, by the LI determining circuit 134 that the LI is not associated with at least one buffered DL PDU in RLC (i.e., an LI is not included in any of the PDUs), the transceiver 110 can be configured to transmit the request for retransmission of at least one subsequent PDU. In an example embodiment, the request for retransmission is based on last in-sequence of the at least one buffered DL PDU. The request for retransmission is repeated until a PDU associated with the LI is received by the DSDS UE 100.

In an example embodiment, if the synchronization manager 130 determines that an out of sequence PDU is received from the network, the transceiver 110 can receive instructions from the synchronization manager 130 to abort transmission of the request to retransmit the at least one subsequent PDU.

Once the transceiver 110 aborts transmission of the request to retransmit the at least one subsequent PDU, the DSDS UE 100 can be configured to perform an ACK/NACK procedure after the expiration of the poll timer at the network.

In another example embodiment, the transceiver 110 receives a request to transmit the SDU from a first stack (i.e., stack-1) associated with a first network. For example, the DSDS UE 100 can segment the SDU into three PDUs (PDU SN1, PDU SN2 and PDU SN3), where each PDU includes data related to the measurement report. The data related to the measurement report can include, e.g., configuration parameters such as, add cell ID, delete cell ID, etc.

Consider a scenario, where the stack-1 transmits the PDU SN1 to the first network, and during the transmission of the subsequent PDU SN2 and PDU SN3 the RF of the DSDS UE 100 is interrupted (RF transmission paused) by a second stack (i.e., stack-2) associated with the second network.

In other methods and systems, the DSDS UE 100 cannot transmit the subsequent PDU SN2 and the PDU SN3 until the RF pause is completed. Thus, the delay in transmitting the subsequent PDU SN2 and the PDU SN3 is equivalent to the RF outage duration. Once the RF resumes at the stack-1, the DSDS UE 100 can be configured to retransmit the missing subsequent PDU SN2 and the PDU SN3 to the first network, but due to the incurrence of the delay the signal characteristics of the cell can become weak. Thus, methods consistent with example embodiments can therefore be used to eradicate the delay in transmitting the PDUs which includes the time critical event.

The time critical activity measuring circuit 136 can be configured to determine whether the RF pause request (received from the stack-2) is for the time critical activity.

The time critical activity includes, e.g., measurement report indicating the configuration parameter, e.g., add cell ID, delete cell ID, or the like.

If the time critical activity measuring circuit 136 determines that the RF pause request (received from the stack-2) is not for a time critical activity, then the transceiver 110 can be configured to transmit the SDU from the first stack associated with the first network.

If the time critical activity measuring circuit 136 determines that the RF pause request (received from the stack-2) is for a time critical activity, then the transceiver 110 can be configured to delay the transmission of the SDU from the first stack associated with the first network.

Furthermore, the transceiver 110 can be configured to abort the SDU transmission if the time critical activity measuring circuit 136 detects that the transmission of the SDU is completed.

Figure 6:
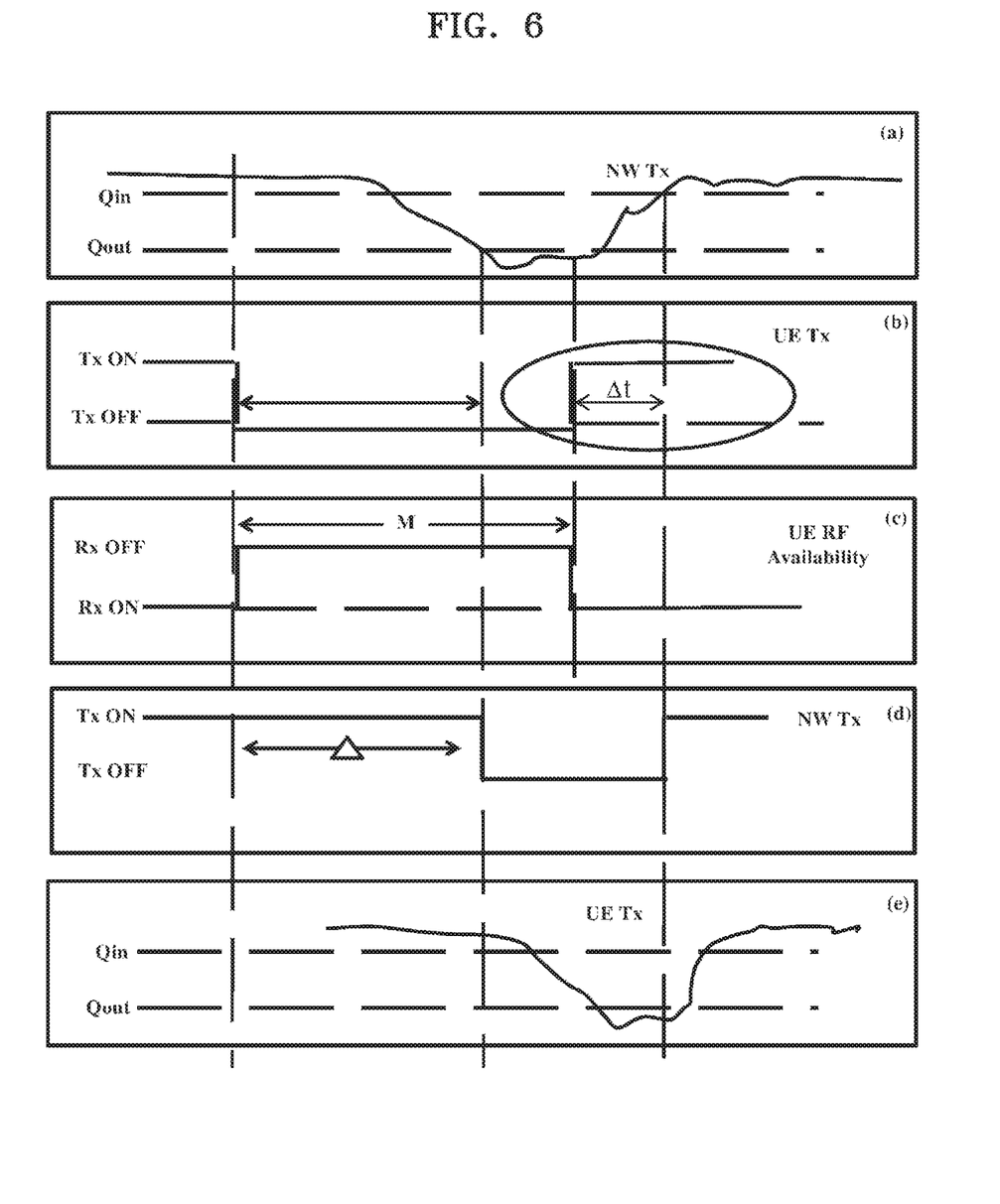
FIG. 6 illustrates channel characteristics between the DSDS UE and the network, according to an example embodiment.

Physical Layer Synchronization Recovery:

FIG. 6 illustrates channel characteristics between the DSDS UE 100 and the network, according to an example embodiment.

In contrast to the systems and methods discussed above with reference to FIG. 1, the an example method can be used by the DSDS UE 100 to transmit the UL-DPCCH irrespective of the SIR quality of the network.

As the DSDS UE 100 is aware of RF voids, the DSDS UE 100 can independently maintain transmission i.e., transmit UL-DPCCH for At time (as shown in block (b) of FIG. 6) irrespective of poor quality of reception (DL DPCCH SIR) (as shown in block (a) of FIG. 6) after stack-1 RF resumption (as shown in block (c) of FIG. 6).

After resumption of the stack-1, the DSDS UE 100 can resume the UL-DPCCH transmission and can therefore allow the DSDS UE 100 to recover from poor SIR quality and eventually the network gains back synchronization once the SIR quality is above threshold Qin (as shown in block (a) of FIG. 6). Once the network gains back the synchronization, the network starts transmitting, i.e., transmission of DL-DPCCH ((as shown in block (d) of FIG. 6) is resumed by the network which in turn improves the DSDS UE 100 reception SIR Quality ((as shown in block (e) of FIG. 6) and the DSDS UE 100 gains back the synchronization.

Figure 7:
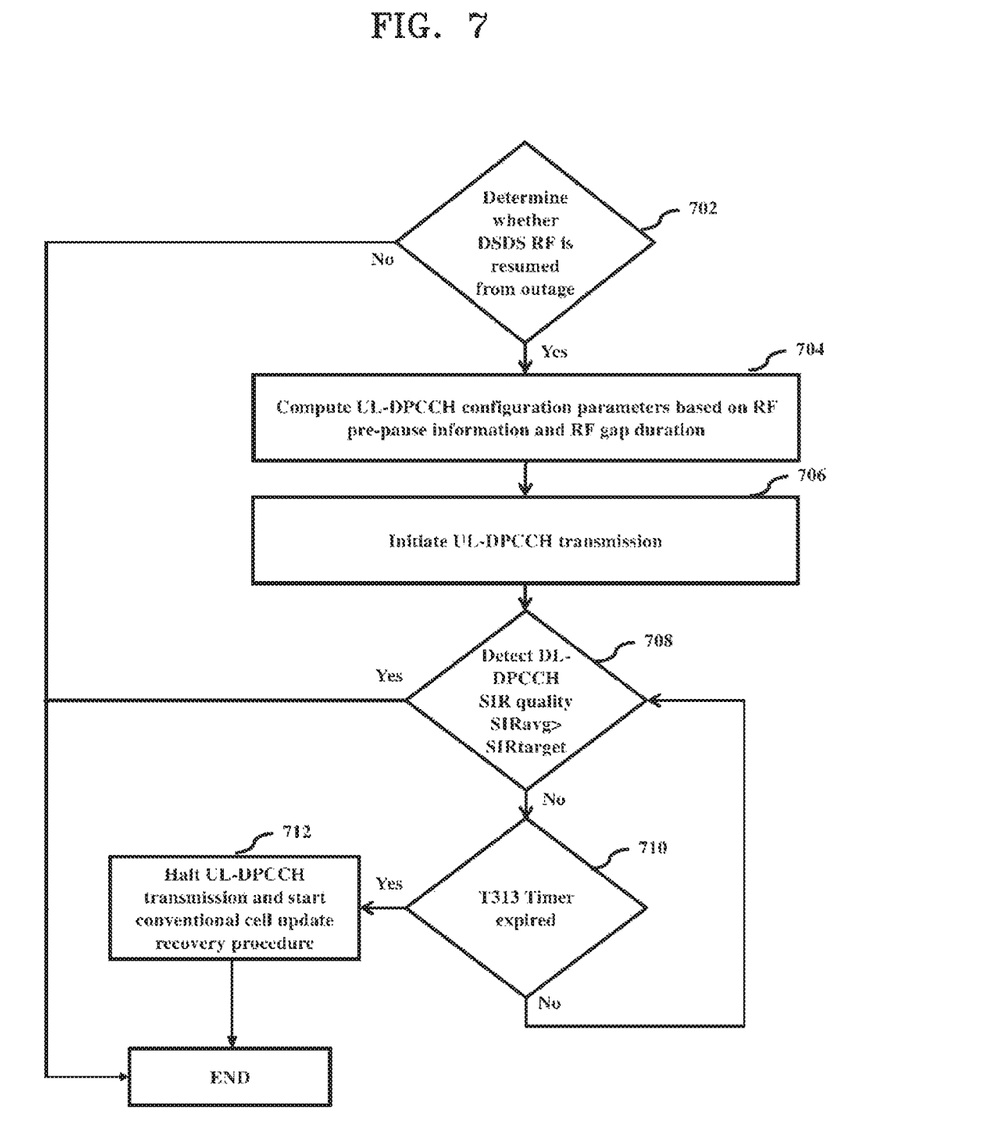
FIG. 7 is a flow diagram illustrating a method for managing synchronization with the network, according to an example embodiment.

FIG. 7 is a flow diagram illustrating a method for managing synchronization with the network, according to an example embodiment.

At step 702, the method includes determining whether the DSDS RF is resumed from the RF outage. In an example embodiment, the RF event detection circuit 132 determines whether the DSDS RF is resumed from outage.

If at step 702, the RF event detection circuit 132 determines that the DSDS RF is not resumed from the RF outage, then the method terminates the operation. If at step 702, the RF event detection circuit 132 determines that the DSDS RF is resumed from the RF outage, then at step 704, the method includes computing UL-DPCCH configuration parameters based on the RF pre-pause information and RF gap duration.

Further, at step 706, the method includes initiating the UL-DPCCH transmission. In an example embodiment, the transceiver 110 initiates the UL-DPCCH transmission based on the UL-DPCCH parameters computed in step 704.

Further, at step 708, the method includes detecting whether the DL-DPCCH SIR quality SIR avg>SIR target. In an example embodiment, the SIR quality measurement circuit detects whether the DL-DPCCH SIR quality SIR avg>SIR target.

If at step 708, the SIR quality measurement circuit detects that the DL-DPCCH SIR quality SIR avg<SIR target, then at step 710, the method includes determining whether the T313 timer has expired. If at step 708, the SIR quality measurement circuit detects that the DL-DPCCH SIR quality SIR avg >SIR target then the method terminates the operation.

If the synchronization manager 130 determines that the T313 timer has expired, then at step 712, the method includes aborting (i.e., halt) the UL-DPCCH transmission and start another cell update recovery procedure. In an example embodiment, the transceiver 110 halts the UL-DPCCH transmission and starts a different cell update recovery procedure.

If at step 710, the synchronization manager 130 determines that the T313 timer has not expired, then the method loops back to perform the step of 708.

Figure 8:
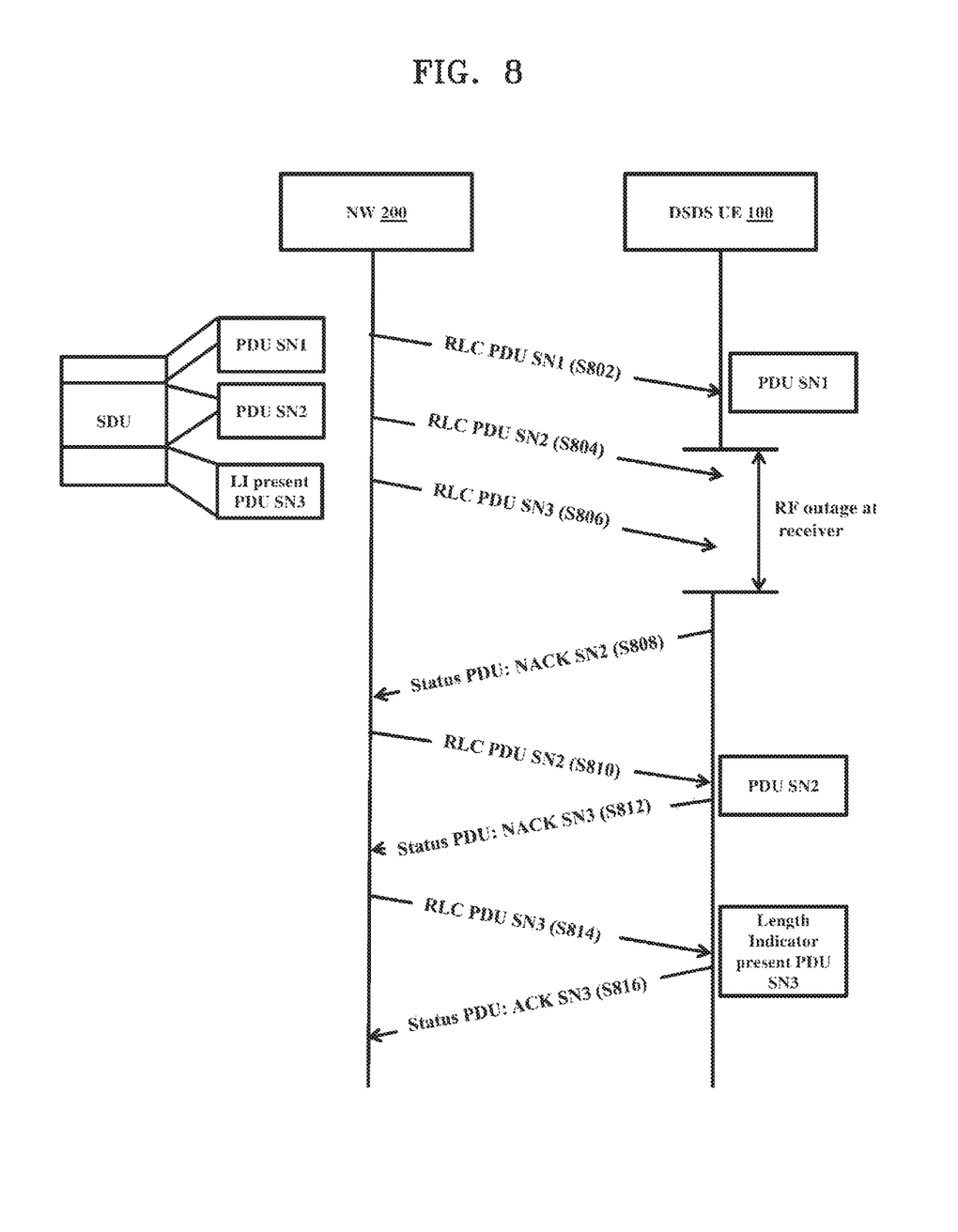
FIG. 8 is a sequence diagram illustrating a step by step procedure for transmitting link layer downlink PDU missed data packets to the DSDS UE, according to an example embodiment.

Link Layer Downlink PDU Miss:

FIG. 8 is a sequence diagram illustrating a step by step procedure for transmitting link layer downlink PDU missed data packets to the DSDS UE 100, according to an example embodiment.

This method can be used for faster recovery of missed RLC PDU which improves the signalling delays in communication between the DSDS UE 100 and a network 200.

Consider a scenario in which the network 200 has transmitted (S802, S804 and S806) RLC PDU SN1, RLC PDU SN2 and the RLC PDU SN3 to the DSDS UE 100 and the DSDS UE 100 only received the RLC PDU SN1, and fails to receive the RLC PDU SN2 and the RLC PDU SN3 due to the RF gap.

Unlike the method and system discussed above with reference to FIG. 2, where the detection of missed PDUs (i.e., the RLC PDU SN2 and the RLC PDU SN3) will happen when the poll timer at the network 200 expires, the method of FIG. 8 detects the missing PDUs (i.e., the RLC PDU SN2 and the RLC PDU SN3), and requests the transmission of the missed PDUs without waiting for expiration of the poll timer.

Referring to the FIG. 8, the RF event detection circuit 132 can be configured to detect, post an RF resume event, if there are buffered downlink PDUs in RLC which does not form the complete SDU (i.e., no LI associated with any of PDUs received). Further, the DSDS UE 100 may have missed one or more subsequent PDUs which completes the SDU if the stack-1 of the DSDS UE 100 was in RF pause for greater than TTI.

Thus, in response to detecting that there are buffered downlink PDUs in the RLC which does not form the complete SDU, then the DSDS UE 100 can request retransmission (S808) of the subsequent PDU (status PDU: NACK SN2). In response to receiving the retransmission request the network 200 can transmit (S810) the RLC PDU SN2 to the DSDS UE 100. Further, the DSDS UE 100 can request retransmission (S812) of the subsequent PDU (status PDU: NACK SN3). In response to receiving the retransmission request the network 200 can transmit (S814) the RLC PDU SN3 to the DSDS UE 100. Thus, when the DSDS UE 100 receives the RLC PDU SN3 associated with LI then the DSDS UE 100 can be configured to transmit the ACK of RLC PDU SN3 with LI received and completion of the SDU.

In an example embodiment, the DSDS UE 100 requests retransmission of the missed PDUs until the DSDS UE 100 receives the PDU with an LI. In another example embodiment, if an out of sequence poll PDU is received from the network 200, then the DSDS UE 100 can abort the retransmission request, and the received poll PDU can be utilized to request for missed PDUs.

In another example embodiment, the maximum reception interval can be estimated based on the previous reception statistics. For example, UMTS DCH channel will be equal to the TTI, for HSDPA channels the TTI can be estimated based on previous reception statistics, thus it is reliable to expect high priority signalling messages to follow deterministic scheduling.

Figure 9:
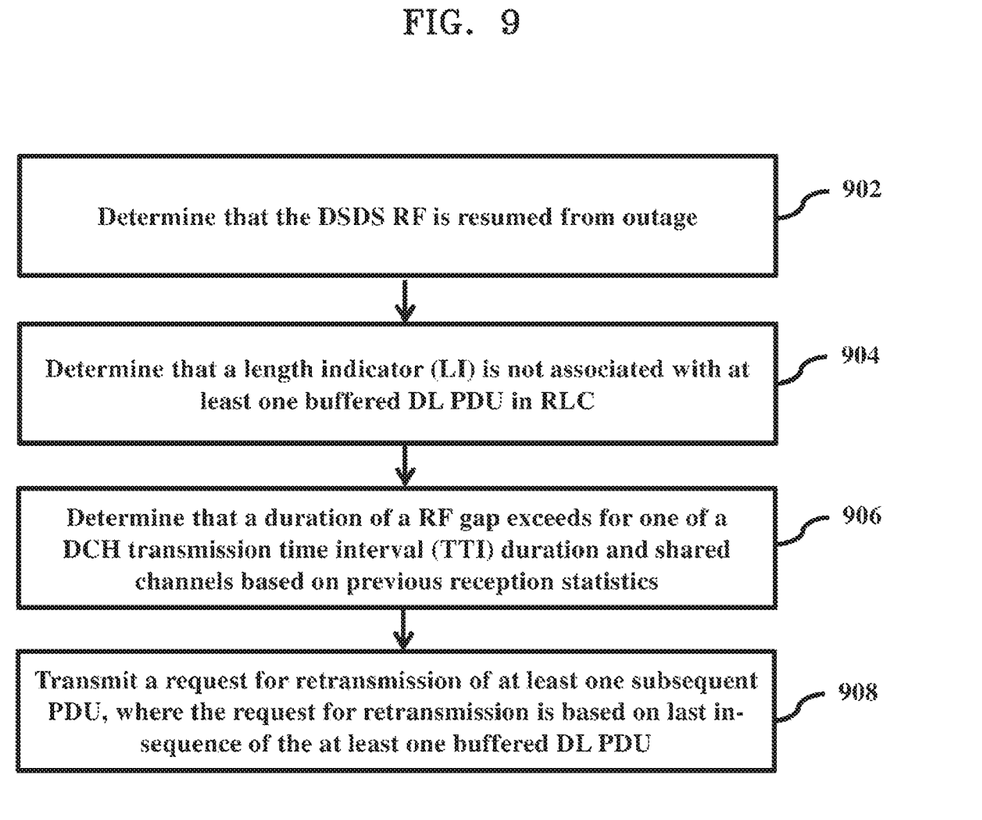
FIG. 9 is a flow diagram illustrating a method for receiving link layer downlink PDU missed data packets by the DSDS UE based on quick recovery of security mode after an RF pause event, according to an example embodiment.

FIG. 9 is a flow diagram illustrating a method for receiving link layer downlink PDU missed data packets by the DSDS UE 100 based on quick recovery of security mode after an RF pause event, according to an example embodiment.

At step 902, the method includes determining that the DSDS RF is resumed from the RF outage. In an example embodiment, the RF event detection circuit 132 determines that the DSDS RF is resumed from the RF outage.

At step 904, the method includes determining that an LI is not associated with at least one buffered DL PDU in RLC. In an example embodiment, the LI determining circuit 134 determines that the LI is not associated with the at least one buffered DL PDU in RLC.

At step 906, the method includes determining that a duration of the RF gap exceeds for one of the DCH TTI duration and shared channels based on previous reception statistics. In an example embodiment, the RF event detection circuit 132 determines that the duration of the RF gap exceeds for one of the DCH TTI duration and shared channels based on previous reception statistics Further, at step 908, the method includes transmitting a request for retransmission of at least one subsequent PDU, where the request for retransmission is based on last in-sequence of the at least one buffered DL PDU. In an example embodiment, the transceiver 110 transmits the request for retransmission of at least one subsequent PDU, where the request for retransmission is based on last in-sequence of the at least one buffered DL PDU.

Figure 10:
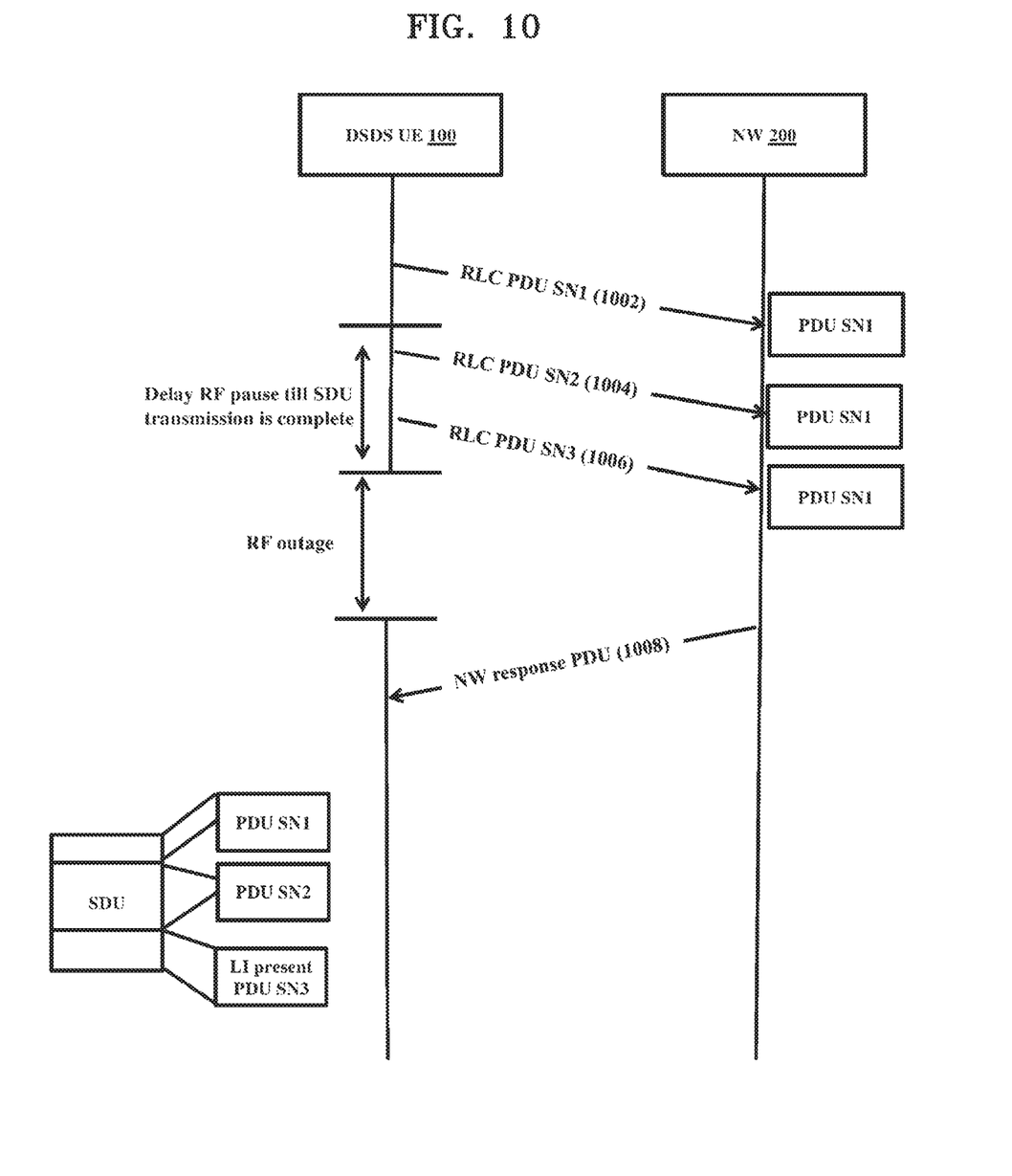
FIG. 10 illustrates a step by step procedure for managing signalling response round trip time delay during transmission of missed data packets to the network, according to an example embodiment.

Signalling Response Round Trip Time Delay:

FIG. 10 illustrates a step by step procedure for managing signalling response round trip time delay during transmission of missed data packets to the network 200, according to an example embodiment.

Consider a scenario in which the DSDS UE 100 is trying to transmit a data packet i.e., one service data unit (SDU) to the network 200. The SDU is segmented into multiple PDUs (e.g., three PDUs as shown in FIG. 3 (*a*)). Due to the signalling SDU being segmented into multiple PDUs, the DSDS UE 100 may require multiple TTIs to complete transmission of the SDU. The essential parameter LI is added to the last PDU, as the LI indicates the length of the PDUs, which in turn indicates completion of the SDU transmission.

In contrast to the method and system discussed above with reference to FIG. 3, the method of FIG. 10 can be used to improve signalling response round trip time delay. According to an example embodiment, the time critical activity measuring circuit 136 can be configured to determine whether the RF pause requested on the stack-2 is for a time critical activity and if the SDU transmission can be completed in a maximum threshold TTIs.

If the time critical activity measuring circuit 136 determines that the RF pause requested on the stack-2 is not for a time critical activity, then the DSDS UE 100 can be configured to delay the RF pause request until SDU transmission is completed. If the signalling SDU submitted by the DSDS UE 100 can trigger a response from the network 200 and transmission of SDU is initiated before reception of the RF pause request, complete transmission of the SDU is allowed before the RF pause, i.e., the RF pause is delayed until the transmission of SDU is complete.

In contrast to the method and system discussed above with reference to FIG. 3, the example method of FIG. 10 allows the DSDS UE 100 to transmit (S1002, S1004, and S1006) the RLC PDU SN1, RLC PDU SN2, and RLC PDU SN3. Thus, the complete SDU is transmitted without any delay caused by RF pause and corresponding the network 200 procedure.

Figure 11:
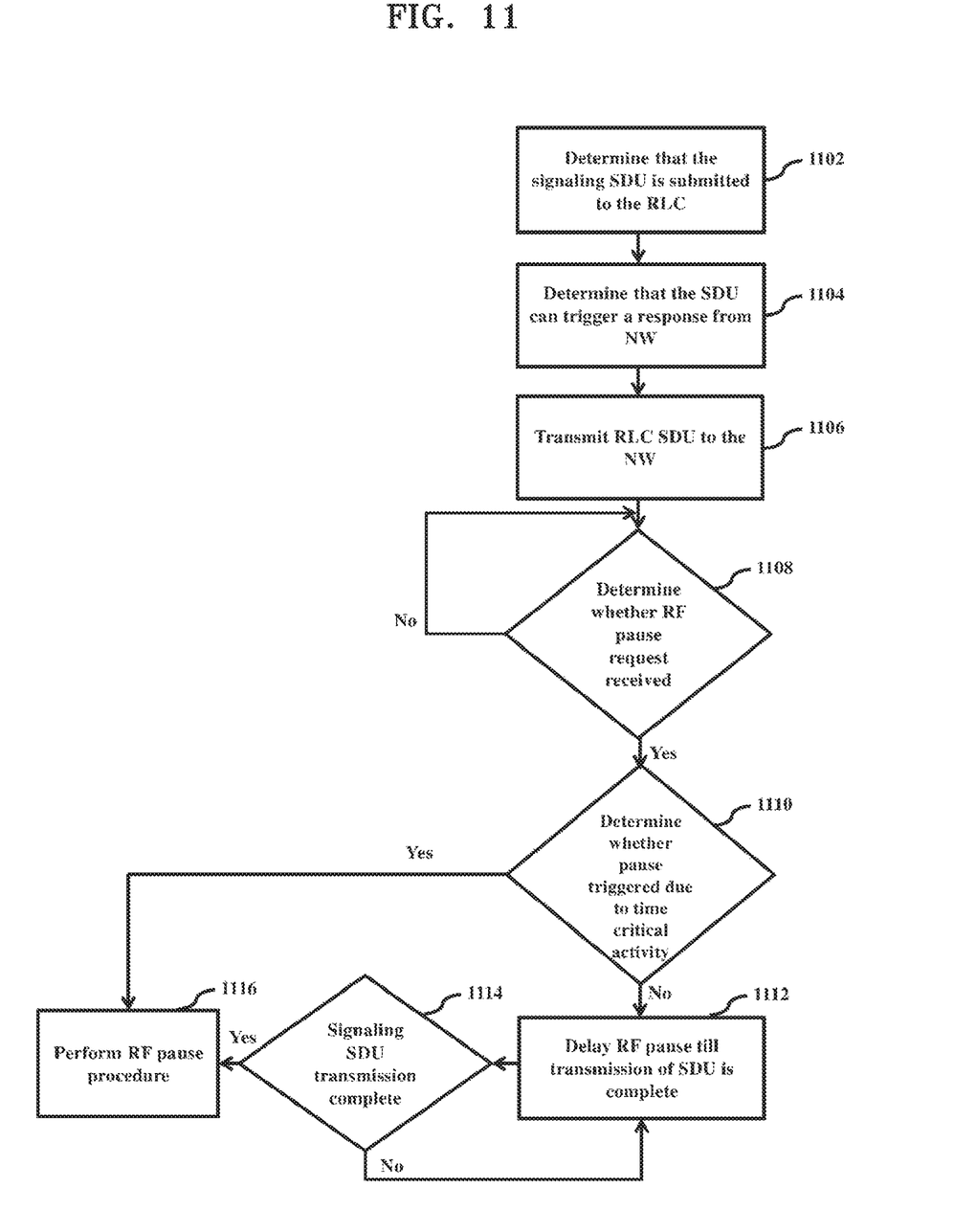
FIG. 11 is a flow diagram illustrating a method for managing signalling response round trip time delay during transmission of missed data packets to the network, according to an example embodiment.

FIG. 11 is a flow diagram illustrating a method for managing signalling response round trip time delay during transmission of missed data packets to the network 200, according to an example embodiment.

At step 1102, the method includes determining that the signalling SDU is submitted to the RLC. In an example embodiment, the DSDS UE 100 determines that the signalling SDU is submitted to the RLC.

At step 1104, the method includes determining that the SDU can trigger a response from the network 200. In an example embodiment, the DSDS UE 100 determines that the SDU can trigger the response from the network.

At step 1106, the method includes transmitting the RLC SDU to the network 200. In an example embodiment, the DSDS UE 100 transmits the RLC SDU to the network 200.

At step 1108, the method includes determining whether an RF pause request is received. In an example embodiment, the DSDS UE 100 determines whether the RF pause request is received.

If at step 1108, the DSDS UE 100 determines that the RF pause request is received, then at step 1110, the method includes determining whether the pause was triggered due to a time critical activity.

If at step 1110, the DSDS UE 100 determines that the pause was not triggered due to a time critical activity, then at step 1112, the method includes delaying the RF pause until transmission of SDU is complete.

At step 1114 the method includes determining whether signalling SDU transmission complete. In an example embodiment, the DSDS UE 100 determines whether signalling SDU transmission complete. If at step 1114, the DSDS UE 100 determines that the signalling SDU transmission is completed, then at step 1116, the method includes performing the RF pause procedure.

If at step 1114, the DSDS UE 100 determines that the signalling SDU transmission is not completed, then the DSDS UE 100 loops back to perform the method at step 1112.

If at step 1110, the DSDS UE 100 determines that the RF pause request was triggered due to a time critical activity, then the RF pause procedure is performed at step 1116.

The example embodiments disclosed herein can be implemented through at least one software program running on at least one hardware device and performing network management functions to control the elements. The elements shown in the FIGS. 4 through 11 include blocks which can be at least one of a hardware device, or a combination of hardware device and software units.

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of example embodiments are examples, and an those skilled in the art will appreciate the general nature of the example embodiments and can, by applying current knowledge, readily modify or adapt for various applications such specific example embodiments without departing from the concepts described herein, and, therefore, such adaptations and modifications should and are intended to be within the meaning and range of equivalents of the present disclosure. It is to be understood that the phraseology or terminology employed herein is for the purpose of description and not of limitation. Therefore, while the example embodiments herein have been described, those skilled in the art will recognize that the example embodiments herein can be practiced with modification within the spirit and scope of the example embodiments as described herein.

We claim:

1. A method for managing synchronization with a network, the method comprising:
   detecting, by a dual SIM dual standby user equipment (a DSDS UE), a radio frequency resume event (an RF resume event);
   monitoring a signal to interference ratio quality (an SIR quality) on a downlink dedicated physical control channel (a DL-DPCCH) of the network;
   transmitting, by the DSDS UE, at least one uplink dedicated physical control channel (at least one UL-DPCCH) to the network based on the RF resume event being detected, wherein the at least one UL-DPCCH is transmitted while the SIR quality on the DL-DPCCH is below a first quality threshold; and
   managing, by the DSDS UE, a downlink (a DL) synchronization with the network.

2. The method of claim 1, wherein the method further comprises:
   monitoring, by the DSDS UE, whether a status of a timer meets a time threshold;
   aborting, by the DSDS UE, the transmitting of the at least one UL-DPCCH to the network based on the SIR quality on the DL-DPCCH exceeding the first quality threshold;
   aborting, by the DSDS UE, the transmitting of the at least one UL-DPCCH to the network based on the timer exceeding the time threshold; and
   performing, by the DSDS UE, a different Cell Update recovery procedure to reestablish connection with the network based on the transmission of the at least one UL-DPCCH to the network being aborted.

3. The method of claim 2, wherein the time threshold comprises an expiration of the timer.

4. The method of claim 1, wherein the method further comprises:
   determining, by the DSDS UE, whether at least one buffered DL PDU in RLC is not associated with a length indicator an (LI);
   transmitting, by the DSDS UE, a request for retransmission of at least one PDU subsequent the at least one buffered DL PDU in response to determining the at least one buffered DL PDU in RLC is not associated with the LI; and
   managing, by the DSDS UE, synchronization of a service data unit (an SDU) corresponding to the at least one buffered DL PDU with the network.

5. The method of claim 4, wherein the determining whether the at least one buffered DL PDU in RLC is not associated with the LI further comprises:
   determining that a duration of an RF gap exceeds one among a DCH transmission time interval (TTI) duration and previous reception statistics of shared channels.

6. The method of claim 5, wherein the previous reception statistics comprises an average duration for reception of high priority signalling messages on the shared channels.

7. The method of claim 4, further comprising repeating the request for retransmission until a PDU associated with the LI is received.

8. The method of claim 4, wherein the method further comprises:
   receiving, by the DSDS UE, an out of sequence PDU from the network; and
   aborting, by the DSDS UE, the transmitting of the request for retransmission of the at least one PDU subsequent the at least one buffered DL PDU.

9. A dual SIM dual standby user equipment (a DSDS UE) for managing synchronization with a network, the DSDS UE comprising:
   a transceiver;
   a processor;
   a memory coupled to the processor; and
   a synchronization manager coupled to the processor and configured to:
   detect a radio frequency resume event (an RF resume event);
   monitor a signal to interference ratio quality (an SIR quality) on a downlink dedicated physical control channel (a DL-DPCCH) of the network;
   control the transceiver to transmit at least one uplink dedicated physical control channel (at least one UL-DPCCH) to the network based on the RF resume event being detected, wherein the at least one UL-DPCCH is transmitted while the SIR quality on the DL-DPCCH is below a first quality threshold; and
   manage a downlink (a DL) synchronization with the network.

10. The DSDS UE of claim 9, wherein the synchronization manager is further configured to:
    monitor whether a status of a timer meets a time threshold;
    abort transmission of the at least one UL-DPCCH to the network based on the SIR quality on the DL-DPCCH exceeding the first quality threshold;
    abort transmission of the at least one UL-DPCCH to the network based on the timer exceeding the time threshold; and
    perform a different Cell Update recovery procedure to reestablish connection with the network based on the transmission of the at least one UL-DPCCH to the network being aborted.

11. The DSDS UE of claim 10, wherein the time threshold comprises an expiration of the timer.

12. The DSDS UE of claim 9, wherein the synchronization manager is further configured to:
    determine whether at least one buffered DL PDU in RLC is not associated with a length indicator (an LI);

control the transceiver to transmit a request for retransmission of at least one PDU subsequent the at least one buffered DL PDU in response to determining the at least one buffered DL PDU in RLC is not associated with the LI; and manage synchronization of a service data unit (an SDU) corresponding to the at least one PDU with the network.

13. The DSDS UE of claim 12, wherein the synchronization manager is further configured to determine whether the at least one buffered DL PDU in RLC is not associated with the LI by determining that a duration of an RF gap exceeds one among a DCH transmission time interval (TTI) duration and previous reception statistics of shared channels.

14. The DSDS UE of claim 13, wherein the previous reception statistics comprises an average duration for reception of high priority signalling messages on the shared channels.

15. The DSDS UE of claim 12, wherein the synchronization manager is further configured to control the transceiver to repeat transmission of the request for retransmission until a PDU associated with the LI is received.

16. The DSDS UE of claim 12, wherein the DSDS UE is further configured to:

identify an out of sequence PDU received from the network; and abort transmission of the request for retransmission of the at least one PDU subsequent the at least one buffered DL PDU.

17. The DSDS UE of claim 9, wherein the synchronization manager is further configured to abort transmission of the at least one UL-DPCCH to the network based on the SIR quality on the DL-DPCCH exceeding a first threshold.

18. A dual SIM dual standby user equipment (a DSDS UE) for managing synchronization with a network, the DSDS UE comprising:

a transceiver;

a processor;

a memory coupled to the processor; and a synchronization manager coupled to the processor and configured to:

detect a radio frequency resume event (an RF resume event);

determine whether at least one buffered downlink protocol data unit (PDU) in radio link control is not associated with a length indicator (an LI);

control the transceiver to transmit a request for retransmission of at least one PDU subsequent the at least one buffered downlink PDU based on determining the at least one buffered downlink PDU in radio link control is not associated with the LI.

* * * * *